United States Patent [19]

Neubauer et al.

[11] Patent Number: 4,639,802
[45] Date of Patent: Jan. 27, 1987

[54] SHRINK RING FOR DISK CLAMPING

[75] Inventors: Jerry L. Neubauer, Stewartville; Laurence J. Schmidt; Steven H. Voss, both of Rochester, all of Minn.

[73] Assignee: International Business Machines Corporation, Armonk, N.Y.

[21] Appl. No.: 624,330

[22] Filed: Jun. 25, 1984

[51] Int. Cl.$^4$ ............................................. G11B 5/012
[52] U.S. Cl. ...................... 360/98; 403/273; 403/373; 411/909
[58] Field of Search .................... 360/97-99, 360/86, 133, 137, 104; 411/909, 517, 353; 403/1, 273, 373-374; 292/256.6; 248/315

[56] References Cited

U.S. PATENT DOCUMENTS

| | | | |
|---|---|---|---|
| 3,619,478 | 11/1971 | Stalger | 411/909 |
| 3,948,073 | 4/1976 | Lovell | 72/356 X |
| 4,190,870 | 2/1980 | Avina et al. | 360/98 |
| 4,282,973 | 8/1981 | Binkowski | 206/444 |
| 4,283,596 | 8/1981 | Vidakovits et al. | 174/84 R |
| 4,290,581 | 9/1981 | Moran et al. | 251/172 |
| 4,479,157 | 10/1984 | Aarts et al. | 360/84 X |
| 4,535,683 | 8/1985 | Dworak et al. | 92/224 |

FOREIGN PATENT DOCUMENTS 2901536  7/1979  Fed. Rep. of Germany ...... 403/273

Primary Examiner—John H. Wolff
Assistant Examiner—David J. Severin
Attorney, Agent, or Firm—Robert W. Lahtinen

[57] ABSTRACT

A disk file data disk stack assembly is clamped using a preloaded heat shrink ring that has an interference fit with the assembly hub. In addition to an inner diameter slightly smaller than the cooperating hub surface, the shrink ring has a full or extended outer cylindrical surface and a reduced area inner cylindrical surface and a reduced area axial end surface to permit effective heat transfer to the ring with minimal conductive heat transfer to the hub and clamping element to enable a differential temperature for effecting shrink ring removal when required.

4 Claims, 2 Drawing Figures

SHRINK RING FOR DISK CLAMPING

BACKGROUND OF THE INVENTION

The present invention relates to magnetic disk storage devices and more particularly to means for compressively clamping a plurality of magnetic disks to form a disk spindle assembly.

A major concern in magnetic disk spindle design is the manner in which the disk is clamped. The disks must be clamped with sufficient force to prevent radial movement that could result from imbalanced rotational forces, thermal expansion or shock/impact loads during shipping. To assure minimum radial shifting of the disks, the stack must be subjected to a specified clamping force. A typical method of applying force to the disk stack is the preloading of a clamping member against the stack using clamping screws. Use of screws for this purpose contributes to several problems. Screws must have sufficient tensile strength which normally requires the use of steel material having a lower coefficient of expansion than the aluminum component parts such as disks, spacers, and the hub. As a result, thermal cycling can cause stack clamping force variations and possibly permanent relaxation. Since only a limited number of screws can be used, the clamping force is not distributed evenly around the stack and peak forces at the screw locations contribute to disk distortion which causes increased axial runout and axial accelerations. The friction in the mating screw threads makes it difficult to determine how much of the tightening torque is being converted to an axial clamping force. This can contribute to additional force variation around the stack. Since screws involve metal-to-metal contact with large contact pressures, the assembly procedure can easily generate contaminating particles, especially when removal is required for rework or balancing. The thread tapping operation for multiple screw holes in the hub adds additional cost to the product.

SUMMARY OF THE INVENTION

The present invention provides a means for applying a clamping force with a single fastener that eliminates the use of screws and their associated problems. The structure used is a shrink ring made of aluminum with its inner diameter slightly smaller than the hub about which it will be received. By elevating the ring temperature, it is made to expand such that is can be guided over the hub. The shrink ring can be heated in an oven, on a hot plate, on a bore heater or by an induction heater coil.

The assembly procedure can be handled either by preloading the disk stack or by applying a preload force to the ring. If a disk stack preload is applied to a clamp member, the heat expanded shrink ring can be merely pushed up against it. This would allow use of a robot with limited load capacity. Alternatively, the stack preload force can be applied directly on the ring as it shrinks on the hub. This would require a continuous supply of heat to the ring while it is being positioned to ensure that the proper stack clamping force is achieved prior to shrinking.

For rework, when it is necessary to replace a disk, the ring can be removed by use of an induction heater, whereby an induction coil is slipped over the outer diameter of the shrink ring. The induction coil is pulsed with a high AC voltage to heat the ring very quickly so that a minimum amount of heat energy is conducted into either the hub or the clamp member.

The geometry of the shrink ring is optimized for the use of an induction heater to remove the ring for spindle rework. The inside of the ring has relieved areas that contact the hub and reduce the corresponding rate of flow into the hub and the edge of the ring has a corner break to reduce the area in contact with the bell clamp. Corner breaks are provided on both sides for symmetry to facilitate automated assembly. While the hub and clamp member contacting areas are reduced, the area of the surface at the outside diameter of the ring is maximized to expose as much surface as possible to the alternating magnetic flux of the induction coil. Thus, heat flow into the ring is enhanced while heat flow out is inhibited. The end result of the geometry is the ability to heat up the ring faster than the hardware it contacts to cause differential heating and expansion to facilitate removal for rework.

Use of the heat shrink ring enables a more even clamping force as a uniform force is applied about the periphery of the ring that also squares itself to the stack. Being a single fastener, less assembly time is required and lower cost is realized as the tapping of multiple screw holes is eliminated. Less particulate contamination occurs by eliminating threaded members which are notorious sources of particulate contamination.

DETAILED DESCRIPTION

Figure 1:
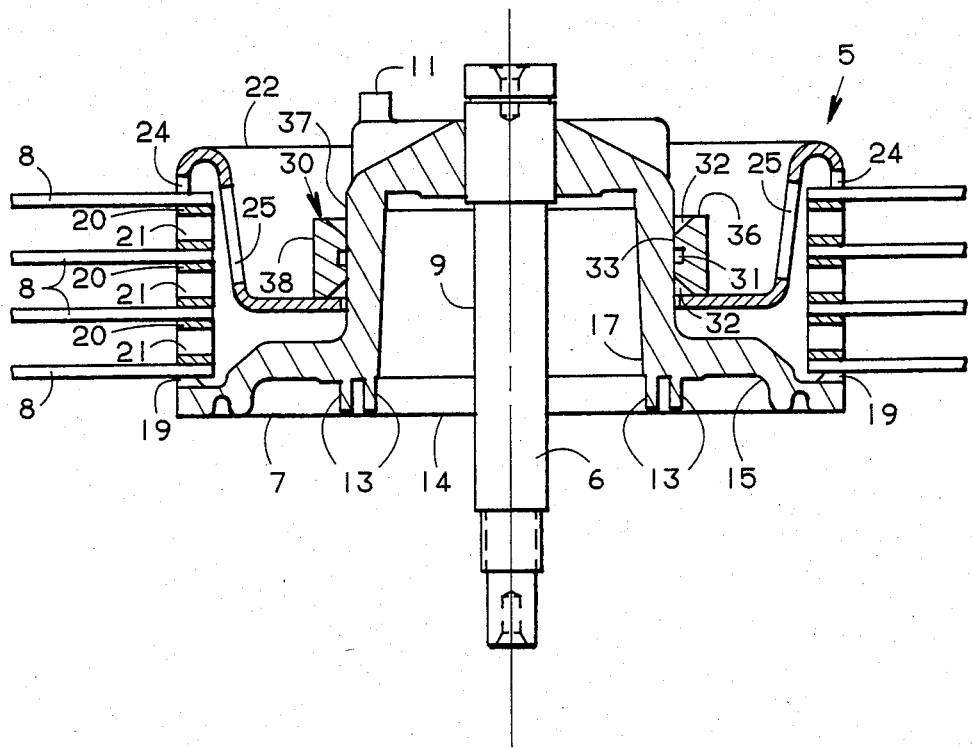
FIG. 1 is a vertical axial section of a spindle assembly for a disk drive data storage file incorporating the shrink ring clamping technique and structure of the present invention.

FIG. 1 shows a spindle assembly 5 for a disk drive storage device including a spindle shaft 6, a hub 7 and a stack of disks 8. The hub 7 is secured to spindle shaft 6 which has a generally cylindrical outer surface 9 surrounding which the disk stack is mounted. At the upper surface of the hub 7 a lug 11 projects which serves to align other parts attached to the hub as a part of the assembly. The annular projections 13 extending from the lower surface 14 of the hub 7 and the annular recess 15 cooperate with the disk drive base casting (not shown) that projects into the central annular recess 17 and surrounds the spindle surface 9.

The disks 8 are supported on hub 7 by the projections 19 that define a radial surface supporting the disk stack in the upward axial direction. Each of the spacers 20 has a series of openings 21. The bell clamp 22 projections 24 and the hub projections 19 create peripherally disposed openings adjacent the upper most disk surface and the lower most disk surface respectively. The openings 25 in bell clamp 22 afford a continuous air path from axially above the disk assembly, through the space between the disk stack and the hub whereupon the air flow is partitioned to flow radially outwardly over each of the disk surfaces.

Figure 2:
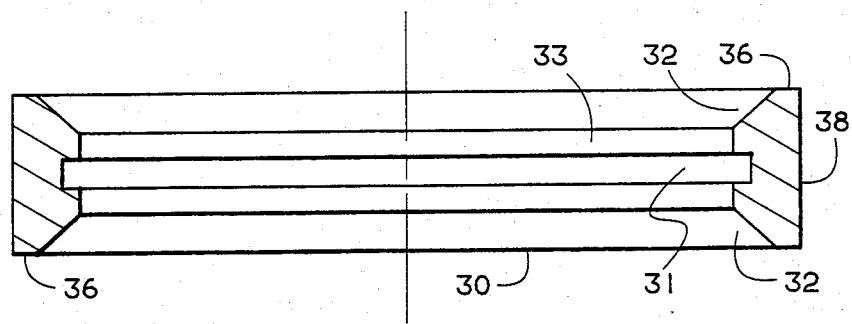
FIG. 2 is an enlarged axial section of the shrink ring of FIG. 1.

Clamping is effected by a heat shrink ring 30, FIGS. 1 and 2 which has an internal diameter slightly smaller than the outside diameter of the hub. The heat shrink ring 30 is of substantially rectangular cross section with a central annular groove 31 extending outwardly from the inner diameter cylindrical surface and annular corner breaks 32 at each axial end of the cylindrical inner diameter surface. The cylindrical surface 33 at the inner diameter is reduced by the groove 31 and the corner breaks 32. While only one annular corner break 32 would be required, the use of two which makes the ring symmetrical, enables easier automated assembly, since assembly can occur in either axial direction and in addition, the additional corner break serves to reduce the inner diameter cylindrical surface area. The corner breaks 32 also reduce the respective radial areas of axial end surfaces 36. With the axial end surface confronting the bell clamp 22 and the internal diameter of cylindrical surface 33 reduced, conductive heat loss to both the hub and the bell clamp are reduced during assembly.

The inner diameter of the shrink ring 30 is smaller than the diameter of the hub surface 37. A typical example would be the use of a hub with the diameter of cylindrical surface 37 0.006 inches larger than the internal diameter of the shrink ring.

The interference between the shrink ring 30 internal diameter and the hub surface 37 diameter is overcome by heating the shrink ring. Shrink ring 30 can be heated in an oven, on a hot plate, on a bore heater or by an induction heater coil. In addition, the assembly can be effected by either preloading the disk stack or applying a preload force to the shrink ring 30. By applying the preload to bell clamp 22, the heat expanded shrink ring can be merely pressed firmly against bell clamp 22. This procedure would permit the use of a robot having limited load capacity. Using the alternate method, the stack preload force is axially applied directly to the ring 30 as it shrinks about the hub surface 37. This involves a downward axial force as seen in FIG. 1 and would require that the ring 30 be hot and expanded until finally positioned about hub surface 37 to assure that a correct clamping force is achieved prior to shrinking. This may require continuous heating of the ring until the final position is achieved.

When it is necessary to disassemble the disk stack for rework, the ring 30 can be removed by use of an induction heater. The induction coil is slipped over the outer cylindrical surface 38 of the ring and pulsed with a high AC voltage to heat the ring very quickly. The extended surface 38 and the reduced area surfaces 33 and 36 allow the ring to be heated with a minimum amount of heat energy being conducted to either hub 7 or bell clamp 22, thereby effecting a temperature differential that enables easy axial removal of the ring 30.

While the invention has been shown and described with reference to a preferred embodiment thereof, it will be understood by those skilled in the art that various changes in form and details may be made therein without departing from the spirit and scope of the invention.

What is claimed is:

1. In a disk drive with a plurality of storage disks, a storage disk assembly including a hub on which said disks are mounted about a common axis in axially spaced relationship for unitary rotary motion comprising means on said hub for supporting said disks in one axial direction, and a shrink ring surrounding a portion of said hub and secured to said hub by interference fit to maintain a predetermined axial force in the direction opposite said one axial direction, said shrink ring having a substantially cylindrical outer surface and a substantially cylindrical inner surface with the axial length of said outer surface exceeding the axial length of said inner surface, whereby the outer surface presents an enlarged heat transfer surface and the inner surface presents a reduced heat transfer surface confronting said hub, said shrink ring being heated and assembled about said hub and an axial force maintained as said ring cools to establish said interference fit and said predetermined axial force on said plurality of disks.

2. The storage disk assembly of claim 1 wherein said shrink ring has a corner break between the inner surface and the adjoining radially extending surface which reduces the inner surface and the radially extending axial end surface to reduce both the inner surface area which confronts the hub and the axial end surface area that axially clamps the disk assembly about the hub, whereby the heat transfer surfaces to both hub and disk stack assembly are reduced.

3. The storage disk assembly of claim 2 wherein there are corner breaks at each axial end of said shrink ring inner surface at the junction with the adjoining radially extending end surface, whereby the ring is symmetrical and may be assembled about said hub with either axial end in clamping engagement with the disk stack assembly.

4. The storage disk assembly of claim 3 wherein said shrink ring inner surface is partitioned into axially separated cylindrical surfaces by an annular recess.

* * * * *